April 28, 1925.

H. J. DAVOLL

BATTERY HOLDDOWN

Filed July 12, 1924

1,535,906

H. J. DAVOLL. INVENTOR.

BY Emil F. Lange

ATTORNEY

Patented Apr. 28, 1925.                                           1,535,906

UNITED STATES PATENT OFFICE.

HARLEY J. DAVOLL, OF LINCOLN, NEBRASKA.

BATTERY HOLDDOWN.

Application filed July 12, 1924. Serial No. 725,751.

*To all whom it may concern:*

Be it known that I, HARLEY J. DAVOLL, a citizen of the United States, residing at Lincoln, in the county of Lancaster and State of Nebraska, have invented certain new and useful Improvements in Battery Holddowns, of which the following is a specification.

My invention relates to battery holddowns, its object being to overcome certain difficulties which have heretofore been inherent on battery supports.

Automobile batteries like other batteries used with internal combustion engines, are provided with supports which nearly always have a loose connection with the battery, the intention being that the relation between the two should be such that the battery could be easily put in place in or removed from its support. All parts of the automobile are however subjected to considerable vibration so that because of the loose relation the battery is thrown about in its support. The battery case is thus injured by the pounding to which it is continuously subjected so that in a short time the corrosive contents of the battery leak out and bind the battery to its support. When in this condition, the battery is very difficult to remove, and occasionally a battery is found in such condition of corrosion that it can be removed only by tearing it to pieces.

My invention therefore has for its primary object the provision of a device for so securing the battery to its support that the battery and its container can suffer no injury whatever from the jarring of the automobile. I also however provide means independent of the regular equipment whereby a corroded battery can be handled to separate it from its support.

Having in view these and other objects which will be mentioned in the description, I will now refer to the drawings, in which—

Figure 1:
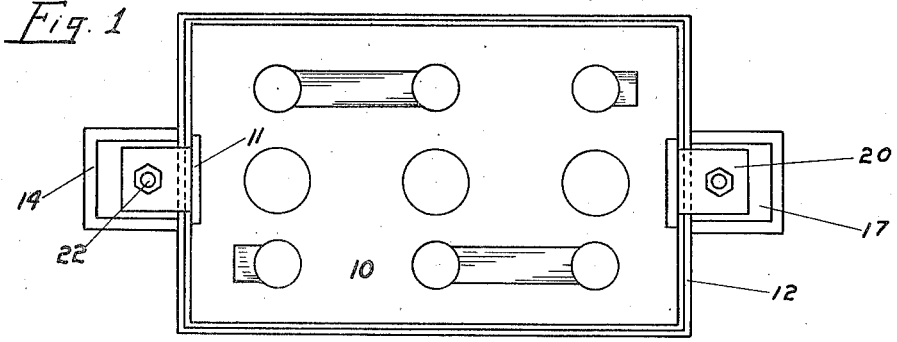
Figure 1 is a plan view of the battery and its support with my battery hold-down attached thereto.
Figure 2:
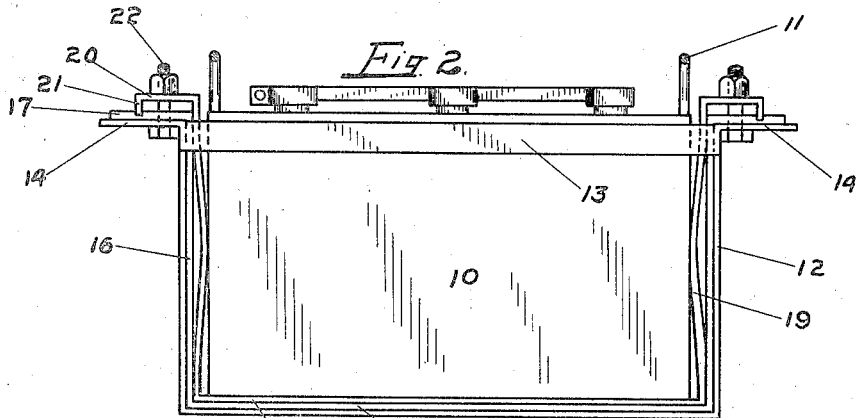
Figure 2 is a side elevation view of the structure shown in Figure 1.
Figure 3:
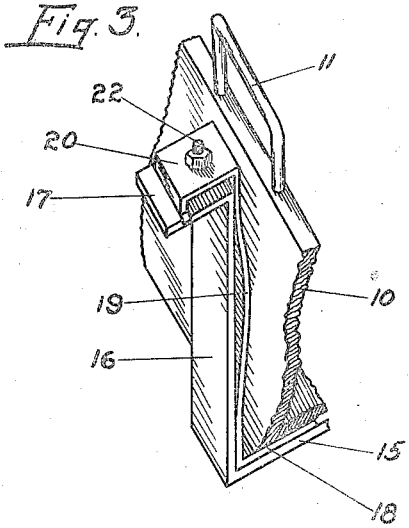
Figure 3 is a view in perspective of a portion of my battery hold-down, showing also a fragment of the end wall of the battery container in its relation to the battery hold-down.
Figure 4:
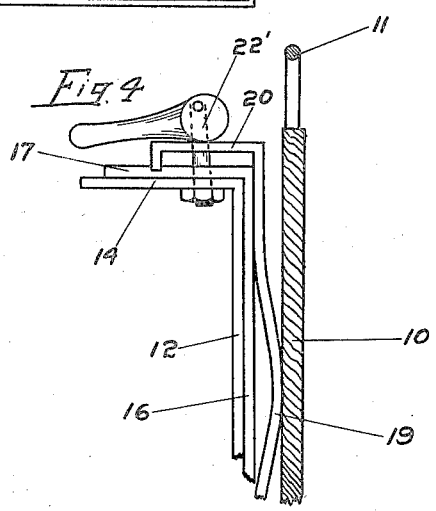
Figure 4 is an edge view of my attachment, showing particularly a modified form of locking means.

The battery container is designated by the numeral 10. This container is usually made of wood, rubber, composition or other similar material and is provided with a pair of handles 11. The usual battery support 12 has many modifications in the various makes of automobiles. The rectangular frame 13 is common to many of the forms, this frame being somewhat larger than the outline of the battery container so that the container may be easily placed in position in the support or removed therefrom. The support is also usually provided with laterally extending ears 14.

My battery hold-down comprises a U-shaped frame having a bottom portion 15, a pair of upwardly extending side members 16 and a pair of outwardly projecting ears 17, the ears being transversely notched in their upper surface. In addition, I have provided a clamp for cooperating with the U-shaped frame for rigidly securing the battery container to the support. The clamp is also U-shaped, having a bottom portion 18, a pair of upwardly extending side members 19 and laterally extending ears 20, the ears 20 terminating in portions 21 which project downwardly and which are adapted to enter the notches in the ears 17. My device includes also a bolt 22 passing through aligning apertures in the ears 17 and 20, the bolt 22 being adapted also to pass through a suitable aperture in the support for the battery.

Both U-shaped members are preferably made from strap iron or similar material, but certain of the relative dimensions are important for the proper functioning of the hold-down. The outer of the U-shaped members is in effect a supplemental support for the battery container. It should therefore be constructed in such dimensions that it will fit snugly but not too tightly in the support 12. The inner of the U-shaped members should fit snugly but not too tightly in the outer U-shaped member, or in other words the length of the bottom 18 should be substantially equal to the inner distance between the sides 16. The length of the sides 19 should be such that the lower extremities of the ears 21 are slightly above the upper surface of the ears 17 before the nut is tightened on the bolt 22. The combined thickness of the two U-shaped members should be such that the battery container will be loose within the inner U-shaped member before the nut is tightened on the bolt 22.

When the two U-shaped members are assembled between the battery container and the support as shown in the drawings, the nuts are tightened on the bolts 22. The tightening of the nuts results in an end thrust on the side members 19 of the inner U-shaped or clamp member, causing them to buckle inwardly toward the battery container. The bowed portions of the side members 19 impart a firm but even pressure on the sides of the battery container and prevent movement of the container relative to the support. The pressure may however be instantly released by loosening the nuts, whereupon the container may be lifted out of the support by means of its handles 11. In case the container has become badly corroded through neglect or otherwise, it may be pried loose by means of any suitable lever inserted between the ears 17 and 20.

It is evident that the essential principles of my invention could be carried out by constructions other than those which I have shown in my drawings. For example the cam lock 22' could be used in the place of the screw threaded bolt 22, this being merely one of the many well known forms of locks which would be suitable for drawing together the ears 20 and 17. I therefore reserve to myself the right to any and all equivalents of the constructions which I claim in specific form.

Having thus described my invention in terms which will be readily understood by others skilled in the art to which it pertains, what I believe to be new and desire to secure by Letters Patent of the United States is:—

A battery hold-down which is adapted to clamp a battery container to its support, said battery hold-down comprising a frame which is adapted to be secured to the support in fixed and spaced apart relation to one of the sides of the battery container, said frame being vertically positioned and having an outwardly projecting ear at its upper extremity, said ear being provided with a transverse groove in its upper surface, a clamping member positioned loosely between said support and the battery container, the lower extremity of said clamping member being held fixed relative to said support, an outwardly projecting ear at the upper extremity of said clamping member, said last named ear overlying the ear of said support and having a downwardly projecting tongue which is adapted to engage the groove in the upper surface of the first named ear, and means for drawing said two ears together to thereby cause buckling of the intermediate portion of said clamping member.

In testimony whereof I affix my signature.

HARLEY J. DAVOLL.